US006532675B2

(12) United States Patent
Letourneau (10) Patent No.: US 6,532,675 B2
(45) Date of Patent: Mar. 18, 2003

(54) DEVICE FOR MEASURING THE ANGLE OF ORIENTATION WITH REFERENCE TO A KNOWN FRAME OF REFERENCE BETWEEN A FIRST OBJECT HAVING A FIRST AXIS AND A SECOND REMOTE DESTINATION

(76) Inventor: Guy Letourneau, 47 Gladys Avenue, Welland, Ontario (CA), L3B 161

( * ) Notice: Subject to any disclaimer, the term of this patent is extended or adjusted under 35 U.S.C. 154(b) by 0 days.

(21) Appl. No.: 09/836,255

(22) Filed: Apr. 18, 2001

(65) Prior Publication Data

US 2002/0152621 A1 Oct. 24, 2002

(51) Int. Cl.[7] .............................. G01C 1/00; G01B 1/00
(52) U.S. Cl. .............................. 33/277; 33/529; 33/371
(58) Field of Search ................................ 33/1 N, 1 PT, 33/277, 278, 281, 283, 286, 371, 373, 391, 529, 534

(56) References Cited

U.S. PATENT DOCUMENTS

| | | | | | |
|---|---|---|---|---|---|
| 2,326,447 A | * | 8/1943 | Enderson | ...................... | 33/529 |
| 2,636,273 A | * | 4/1953 | Morris | ...................... | 33/281 |
| 2,717,454 A | * | 9/1955 | Sekki | ...................... | 33/529 |
| 3,038,261 A | * | 6/1962 | Blain | ...................... | 33/529 |
| 3,707,772 A | * | 1/1973 | Cotter | ...................... | 33/373 |
| 4,188,729 A | * | 2/1980 | Peterson | ...................... | 33/332 |
| 4,442,606 A | * | 4/1984 | Graham et al. | ............... | 33/1 N |
| 5,154,000 A | * | 10/1992 | Mahoney et al. | .............. | 33/343 |
| 5,167,075 A | * | 12/1992 | Weldy et al. | .................. | 33/343 |
| 5,531,031 A | * | 7/1996 | Green | ...................... | 33/281 |
| 5,561,911 A | * | 10/1996 | Martin | ...................... | 33/290 |
| 5,768,790 A | * | 6/1998 | Norman | ...................... | 33/334 |
| 6,124,935 A | * | 9/2000 | Matthews | ...................... | 33/286 |
| 6,240,649 B1 | * | 6/2001 | McElroy | ...................... | 33/286 |
| 6,351,890 B1 | * | 3/2002 | Williams | ...................... | 33/286 |

* cited by examiner

Primary Examiner—G. Bradley Bennett (57) ABSTRACT

A device for measuring the angle of orientation with respect to a known frame of reference between a first object having a first axis and a second remote destination comprises a first arm member defining a first longitudinal axis and an object engaging surface substantially parallel to the first longitudinal axis for engaging a first object. A second arm member is connected in pivotal relation to the first arm member at a primary joint for pivotal movement about a first transverse pivot axis intersecting the first longitudinal axis and defining a second longitudinal axis intersecting the first longitudinal axis and the first transverse pivot axis. A laser is mounted on the second arm member for projecting a laser beam along a laser beam axis parallel to the second longitudinal axis. A first angle measurer is mounted on the second arm member to measure and indicate the angle of the second longitudinal axis with respect to a fixed reference frame other than the first longitudinal axis.

19 Claims, 8 Drawing Sheets

DEVICE FOR MEASURING THE ANGLE OF ORIENTATION WITH REFERENCE TO A KNOWN FRAME OF REFERENCE BETWEEN A FIRST OBJECT HAVING A FIRST AXIS AND A SECOND REMOTE DESTINATION

FIELD OF THE INVENTION

The present invention relates to devices for measuring the angle of orientation with reference to a known frame of reference between a first object having a first axis and a second remote destination, and more particularly to such devices used in the construction industry for installing water pipes, sprinkler pipes, drain pipes, electrical conduit, heating ducts, and the like, buildings, building frames and rafters, laying bricks, forming concrete work, and so on.

BACKGROUND OF THE INVENTION

During the construction and renovation of buildings, it is common to install water pipes, sprinkler pipes, drain pipes, electrical conduit, heating ducts, and so on. Very commonly, a lengthy section of pipe, conduit, or duct must be installed at an angle between two other similar pipes, conduits, or ducts. The installation of such angled sections of pipe, conduit, or duct might be between two opposed ends of pipes, conduits, or ducts that are axially offset one from the other. In this case, it is common to use a correctly angled elbow connector at each end of the section of pipe, conduit, or duct being installed. In many cases, the section of pipe, conduit, or duct being installed might be as mush as fifty or one hundred feet long, or even more. Accordingly, it is necessary to accurately determine the necessary angle or angles of the elbow connectors so that the installed section of pipe, conduit, or duct will fit properly and will not be misaligned. Typically, there is very little room for error as these pipes, conduits, or ducts are rigid, so that these elbows must be constructed quite accurately. In instances such as where the two opposed ends of the pipes, conduits, or ducts are both horizontally and vertically axially offset one from the other, it is especially difficult to determine the angle of the elbow connectors.

Also, if two pipes, conduits, or ducts that are axially offset one from the other are to be joined, it is possible to merely make an "S"-shaped connector. It is necessary to know how much offset must be accommodated by the "S"-shaped connector. This is often difficult to determine from merely measuring, and also may be inaccurate, since the distance between the two pipes to be joined could be fifty or one hundred feet, or more.

Similarly, "Y"-connectors are used to connect a branch pipe, conduit, or duct into an existing pipe, conduit, or duct, and so on. The branch must be accurately constructed at a precise angle so as to meet its target, which might be another pipe, conduit, or duct, and so on, or might be an opening to a furnace, a bin, a hopper, a vessel, or the like. The destination may be horizontally and vertically axially offset from the starting point, thus making it especially difficult to determine the angle of the elbow connectors.

Also, when hanging pipes from a ceiling, hanging an electrical fixture from the ceiling, or when building a wall, it is necessary to hang or at least attach the pipe, electrical fixture, or wall from the ceiling, yet position it with respect to a specific location on the floor. Typically, levels and plumb lines are used; however, the use of levels can easily cause inaccurate results and the use of plumb line is time consuming and in some cases is not feasible.

Another example is the connection of a vertical plumbing pipe to an existing horizontal plumbing pipe in a ceiling at a "T"-intersection. It may be necessary to extend the vertical pipe upwardly at an angle to intersect the horizontal pipe at the ceiling. Alternatively, it may be necessary to install a connecting section of plumbing pipe downwardly at an angle from a specific location on the existing horizontal plumbing pipe to meet the vertical plumbing pipe. In either case, the correct angle for one or two angled elbow connectors must be determined.

In these above stated examples, it is common in order to determine the angle of a straight line between two remote objects to have to climb up a ladder, attach a line to both objects, ensure the line is taut and straight, and place a protractor on the line to determine an angle. This is extremely time consuming, inaccurate, and in many cases cannot even be done because of distances involved, objects being in the way, and so on. Further, in many cases, it is necessary to climb over machinery, which is very unsafe and therefore most likely prohibited.

It is also often necessary to determine a compound angle, or in other words, an angle that must be determined in two stages. For instance, a first pipe, conduit, or duct has a "Y"-intersection of a known angle, such as thirty degrees, installed in it that extends towards, but somewhat skew to, a second pipe, conduit, or duct. In order to extend the extension portion of the "Y"-intersection to the second pipe, conduit, or duct, it is necessary to determine the angle of an elbow connector that will accommodate the both known angle of the "Y"-intersection and will also accommodate the skew angle. Determining the correct angle is quite difficult and time consuming.

In another example, when constructing a wooden frame structure such as a roof, it is sometimes necessary to calculate specific angles between one location and another, such as in a roof truss. Again, analogously to the situations discussed above, this may be difficult, especially for a large structure.

The closest known prior art is U.S. Pat. No. 5,842,282 issued on Dec. 1st, 1998 to Ting. That patent discloses a laser angle adjustment device for laser measuring instruments. The device comprises an single elongate casing 10 that retains the remainder of the elements of the device. A transverse hole (not shown) within the casing 10 receives and retains an aluminum barrel 1. A top cover 2 is mounted within the aluminum barrel 1 for rotation about an axis transverse to the length of the elongate casing 10. An annular index dial 3 is secured to the top cover 2 for rotation therewith. A horizontal chamber 22 forms part of the top cover 2. A laser 9 is mounted within the chamber 22 to thereby be rotatable therewith. The laser 9 is can be aimed in any angular direction within a single plane perpendicular to the axis of rotation. There is no angle measuring device mounted on the rotatable top cover 2 that permits measurement of the orientation of the laser 9 with respect to a fixed known reference frame.

A device for levelling and squaring that is somewhat similar to the above described laser angle adjustment device is disclosed in U.S. Pat. 5,531,031 issued on Jul. 2, 1996 to Green entitled Laser Level and Square. The device includes a level body having a spirit vial or electronic inclinometer, wherein a battery powered laser module assembly is rotatably mounted in one end of the level body for emitting a visible laser beam therefrom. The level body contains a transparent window which allows the laser beam to exit therefrom. Further, the level body has a groove parallel the longitudinal axis thereof to provide a horizontal reference line. The laser beam establishes a precise line that is variably adjustable from horizontal to 90 degrees thereto, for alignment and squaring uses. Magnetic strips are used for attaching the level body to ferromagnetic materials.

U.S. Pat. No. 5,561,911 issued on Oct. 8, 1996 to Martin discloses a Level Tool with Laser Light Alignment Capabilities that includes a straight rigid first rail having a levelling vial coupled thereto. A laser light source is coupled to the first rail and with the laser light source transmitting a laser beam that is longitudinally aligned with the first rail to a remote location for use in alignment operations. A straight rigid short second rail is rotatably coupled at its first end to the first end of the first rail for 180 degree movement with respect thereto. A protractor indicates the relative angle between the first and second rails.

The problem with the known prior art devices is that they measure a relative, angle between two members that pivot with respect to each other, or in other words, measure an angle with respect to a moving reference frame, not with respect to a fixed reference frame.

It is an object of the present invention to provide a device for measuring the angle of orientation with reference to a known frame of reference between a first object having a first axis and a second remote destination.

SUMMARY OF THE INVENTION

In accordance with one aspect of the present invention, there is disclosed a novel device for measuring the angle of orientation with respect to a known frame of reference between a first object having a first axis and a second remote destination. The device comprises a first arm member defining a first longitudinal axis and an object engaging surface substantially parallel to the first longitudinal axis for engaging a first object thereagainst. A second arm member is connected in pivotal relation to the first arm member at a primary joint for pivotal movement about a first transverse pivot axis intersecting the first longitudinal axis and defining a second longitudinal axis intersecting the first longitudinal axis and the first transverse pivot axis. A laser is mounted on the second arm member for projecting a laser beam along a laser beam axis parallel to the second longitudinal axis. A first angle measuring means is mounted on the second arm member to measure and indicate the angle of the second longitudinal axis with respect to a fixed reference frame other than the first longitudinal axis.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the device according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF A PREFERRED EMBODIMENT

Figure 5:
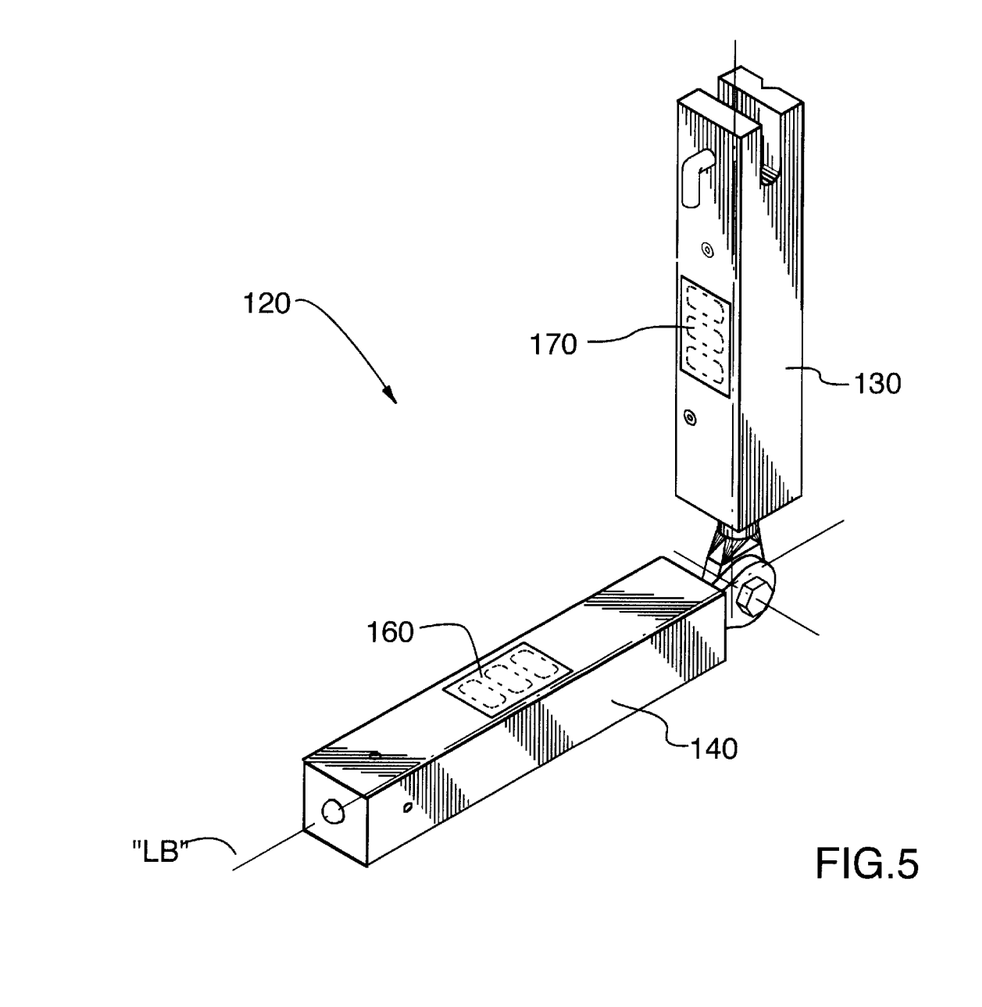
FIG. 5 is a side elevational perspective view of an alternative embodiment of the device for measuring the angle of orientation with respect to a known frame of reference, according to the present invention.

Reference will now be made to FIGS. 1 through 4, which show a preferred embodiment of the device of the present invention, FIG. 5, which shows an alternative embodiment of the device of the present invention, as indicated by general reference numeral 20, and also to FIGS. 6 through 9, which show the preferred embodiment device of the present invention in use.

As can be best seen in FIGS. 6 through 9, the device 20 is for measuring the angle of orientation with respect to known frame of reference, between a first object, such as pipe 22, having a first axis "A", and a second remotely destination, such as a second pipe 24 located remote to the first pipe 22. The first pipe 22 and the second pipe 24 are vertically offset one from the other and are also laterally offset one from the other, thus making it difficult using conventional means to find the angle from the first pipe 22 to the second pipe 24, but which can be done with ease with the device 20 of the present invention.

Referring now to FIGS. 1 through 4, the preferred embodiment device 20 comprises a first arm member 30 having a connected end 30a, a free end 30b, and defining a first longitudinal axis "B". A first object engaging surface 36a is disposed on the exterior of the first arm member 30 for engaging a first object, specifically an open surfaces such as a floor, a wall, the exterior of a pipe, a joist, and so on. A second object engaging surface 36b is disposed adjacent the free end 30b of the first object engaging surface 36a first arm member 30 and is one of the two opposed surfaces that define a slot 38 used to receive a first object therein, such as the first pipe 22. The first object engaging surface 36a and the second object engaging surface 36b are each oriented substantially parallel to the first longitudinal axis "B" so that the first longitudinal axis "B" will be parallel to the first axis "A" of the first pipe 22.

The device 20 further comprises a securing means, as indicated by the general reference numeral 80, operatively mounted adjacently the slot 38 disposed in the first arm member 30. The first securing means 80 comprises a threaded fastener 82 threadibly engaged within a threaded bore hole 84 for temporarily securing the device 20 to a first object, such as the first pipe 22, with the end of the first pipe 22 disposed in the slot 38. The threaded fastener 82 is turned until a captured portion of the first pipe 22 is securely engaged against the second object engaging surface 36*b*. In this manner, the first arm member 30 can be temporarily mounted on the first pipe 22 such that the first longitudinal axis "B" is accurately aligned parallel to the first axis "A" of the first pipe 22.

A second arm member 40 is connected in pivotal relation to the proximal arm portion 32 of the first arm member 30 at a primary joint 42 for pivotal movement about a first transverse pivot axis "T" that intersects the first longitudinal axis "B". The first arm member 30 has a spade-shaped connector 31 retained in frictional relation within the connected end 30*a* of the first arm member 30. Similarly, the second arm member 40 has a spade-shaped connector 41 retained in frictional relation within its connected end 40*a*. The two spade-shaped connectors 31,41 are held together by co-operating threaded fasteners 46, so as to preclude unwanted relative angular movement between the first arm member 30 and the second arm member 40. In other words, if the first and second members 30, 40 are set to a relative angular orientation, they will remain in that relative angular orientation until purposely moved, or unless accidentally bumped, but they will not change their relative angular orientation rarely due to the weight of either of the arms and the various elements mounted thereon. In the preferred embodiment illustrated, the spade-shaped connectors 31,41 have a low friction washer 39, preferably made from neoprene™ or nylon™, or another suitable material, in order to provide low friction mating surfaces. In this manner, the spade-shaped connectors 31,41 are held together in snug fitting relation that allows for the necessary angular movement between the first arm member 30 and the second arm member 40, yet precludes unwanted angular movement of the first arm member 30 and the second arm member 40.

The second arm member 40 defines a second longitudinal axis "C" that intersects the first longitudinal axis "B" and also intersects the first transverse pivot axis "T". Accordingly, the first longitudinal axis "B", the second longitudinal axis "C" and the first transverse pivot axis "T" all intersect at point "P".

In the preferred embodiment as illustrated, the first arm member 30 comprises a proximal arm portion 32 and a distal arm portion 34. The distal arm portion 34 is connected in axially pivotal relation to the proximal arm portion 32 by means of a male fitting portion 34*a* of the spade connector 31 mounted on the distal arm portion 34 so as to be retained in snug fitting relation within a co-operating female fitting 32*a* mounted in the distal arm portion 34. The male fitting 34*a* has an annular protrusion 34*b* that is very slightly larger in diameter than a co-operating female annular recess 32*b* formed within the female fitting 32*a*, to thereby provide an interference fit for retaining the male fitting 34*a* within the female fitting 32*a*, yet still accommodate the necessary pivotal movement of the proximal arm portion 32 and the distal arm portion 34 with respect to each other. Both the male fitting 34*a* and the female fitting 32*a* are made from a low friction plastic material such as neoprene™ or nylon™ to help accommodate the pivotal movement. In this manner, the distal arm portion 34 is connected to the proximal arm portion 32 for pivotal movement about an arm pivot axis "D" that is parallel to the first longitudinal axis "B" and, in the preferred embodiment as illustrated, the arm pivot axis "D" is collinear with the first longitudinal axis "B". The proximal arm portion 32 must have an overall peripheral width that is less than the flat-to-flat distance across the distal arm portion 34, from the first object engaging surface 36*a* to the opposed surface 36*c*, such that when the first object engaging surface 36*a* of the distal arm portion 34 is disposed against a surface, the proximal arm portion 32 can be rotated without causing the distal arm portion 34 to lift off the surface it is engaging. In the preferred embodiment, as illustrated, the proximal arm portion 32 is circular in cross-section so that it will never project past the outer surfaces of the distal arm portion 34, irrespective of the relative angular rotation of the proximal arm portion 32 with respect to the distal arm portion 34.

The distal arm portion 34 also comprises a "V"-shaped slot 35 disposed along the length thereof, and parallel to the first longitudinal axis "B". The slot 35 is for receiving a rounded surface. A clamping means (not shown) can optionally be included to permit clamping of the distal arm portion 34 to an object having such a round surface. Also, a magnet (not shown) can optionally be included to permit the distal arm portion 34 to be retained in place on a ferrous metal duct or pipe, or the like. Further, two mounting apertures 37 are included in the distal arm portion 34 for permitting the device 20 to be temporarily mounted by means of nails or threaded fasteners to a wooden joist, fence post, or the like.

A laser 50, powered by batteries 51 and controlled by pushbutton 53, is mounted within a bore hole 54 on the second arm member 40 for projecting a laser beam 52 along a laser beam axis "LB". The laser beam axis "LB" is parallel to the second longitudinal axis "C" and may even be collinear with the second longitudinal axis "C". The bore hole 54 is sized to closely accommodate the laser 50. Optionally, four set screws 56 are threadibly engaged in co-operating threaded bore holes 58 and may be used to accurately align the laser 50. The laser beam 50 serves to essentially extend the length of the second arm member 40 indefinitely such that the second arm member 40 in effect "reaches" a second remote second destination 24, such as a remote pipe 24 that must be connected to a first object such as first pipe 22. It is also contemplated that a second laser could be included in the first arm member 30 in a manner similar to the laser 50 in the second arm member 40, so as to essentially extend the length of the first arm member 30.

A first angle measuring means 60 is mounted on the second arm member 40 to measure and indicate the angle of the second longitudinal axis "C" of the second arm member 40 with respect to a fixed reference frame, other than the first longitudinal axis "B", with the fixed reference frame in this case being a vertical orientation with respect to the earth, as the first angle measuring means comprises an analog type gravity based angle indicator 60. In the preferred embodiment as illustrated, the gravity based angle indicator 60 comprises a circular protractor type scale 61 with two opposed zero degree marks and two opposed 90 degree marks. The zero degree marks are 180 degrees apart and are oriented perpendicularly to the longitudinal axis "C" of the second arm member 40. The scale increases in each direction from each zero degree mark to the two 90 degree marks half way between the zero degree marks. A 3-prong gravity based pointer 68 is mounted in freely pivoting relation on the scale 61 at pin 69, and has a weighted base portion 62 that causes the middle prong 63 of the 3-prong gravity based indicator points to one of the zero degree marks when the second arm member 40 is horizontal and points to one of the 90 degree marks when the second arm member 40 is vertical. The other two prongs 64, 66 point to the complement (90 degrees minus the angle in question) of the angle that the middle prong 63 is pointing to, or in other words also indicates the complement of the angle between the second arm member, specifically the second longitudinal axis "C", with respect to the same fixed reference frame, specifically with respect to vertical. Preferably, the scale 61 and the prongs 63,64 and 66 of the pointer 68 are viewable from two opposed directions or in other words from both sides of the gravity based angle indicator 60. Such viewing may be accomplished by various constructions of the gravity based angle indicator 60, such as by including a transparent casing having the scale 61 disposed thereon.

Figure 1:
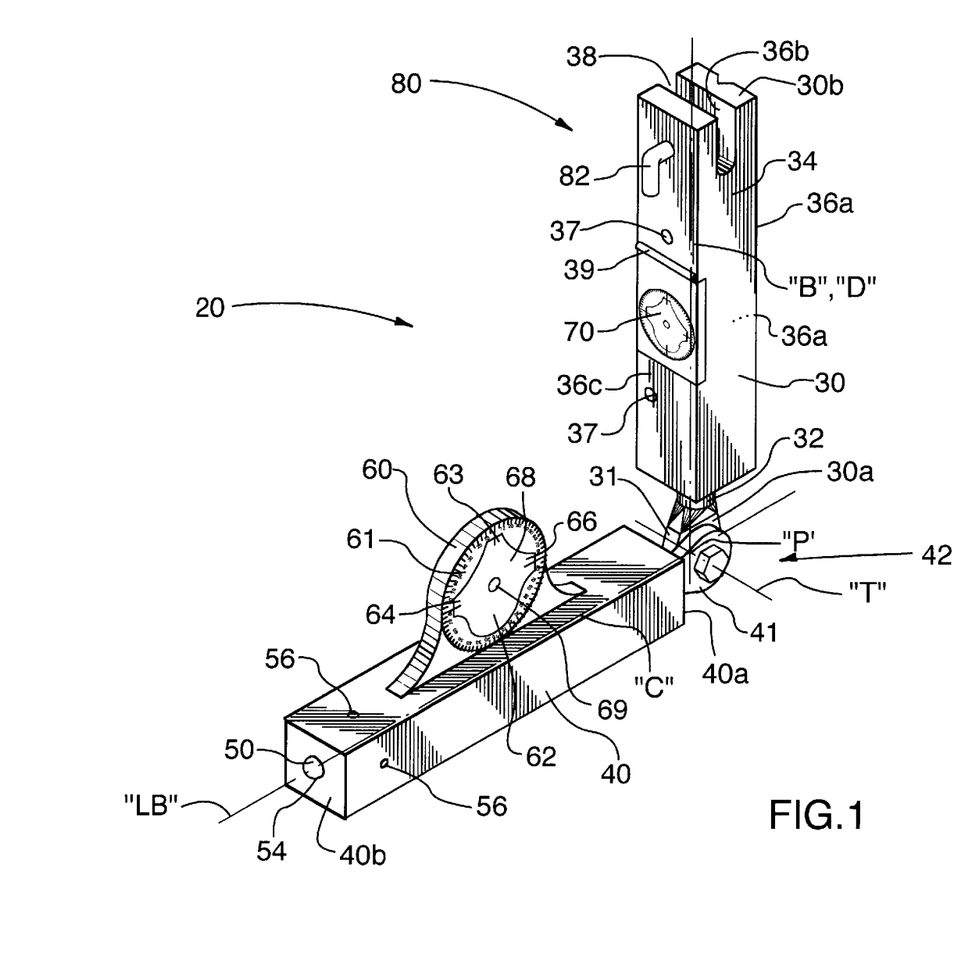
FIG. 1 is a perspective view of a preferred embodiment of the device for measuring the angle of orientation with respect to a known frame of reference, according to the present invention.
Figure 2:
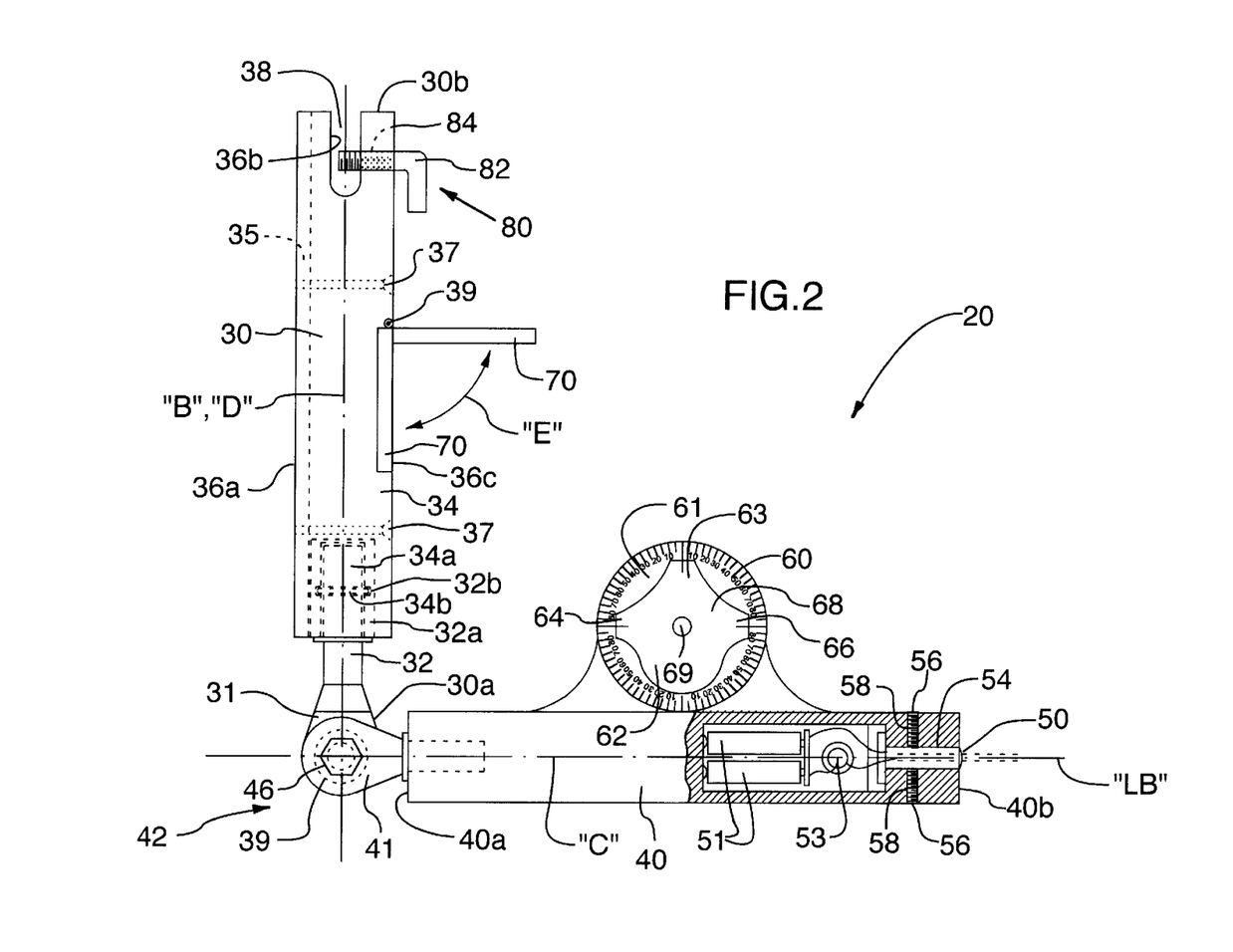
FIG. 2 is a side elevational view of the device of FIG. 1, with the first and second arms in an opened position.
Figure 3:
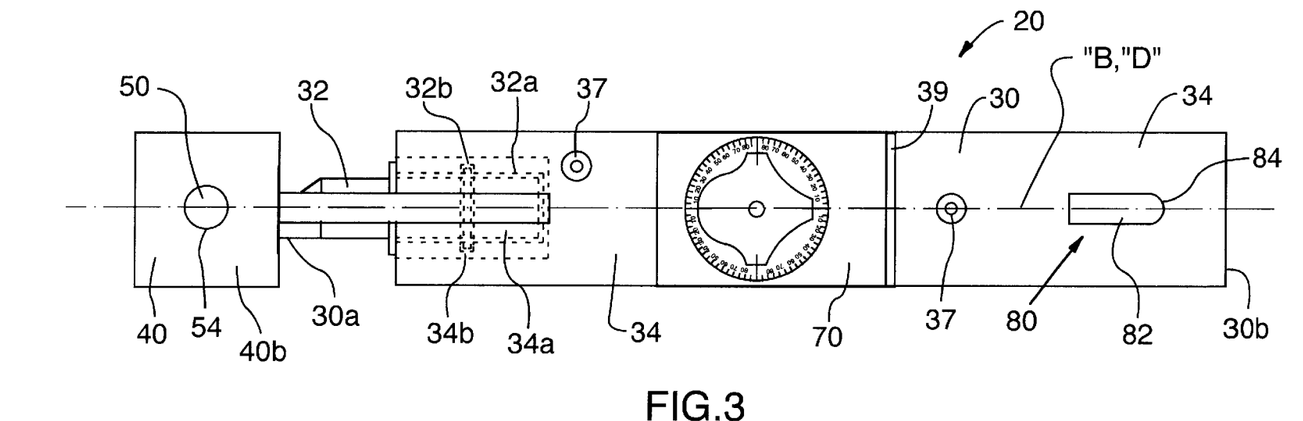
FIG. 3 is an end elevational view of the device of FIG. 2, taken along site line 3—3.
Figure 4:
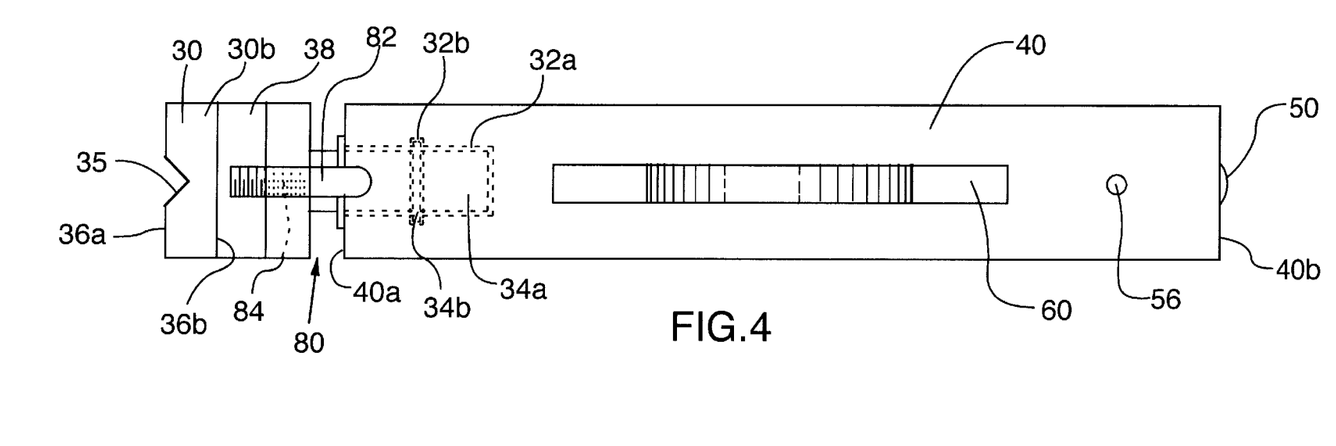
FIG. 4 is a top plan view of the device of FIG. 1, taken along site line 4—4.

There is also a second angle measuring means 70 mounted on the first arm member 30 so as to be oriented transversely the first longitudinal axis "B", by means of a hinge member 39, for movement between a stowed position whereat the second angle measuring means 70 is retained within a recess 37 as is best seen in FIG. 2, and for movement to an extended in use position, as indicated by arrow "E". In the extended in use position, the second angle measuring means can be used to indicate whether the first arm member 30 is level in a side-to-side orientation. In the preferred embodiment as illustrated, the second angle measuring means 70 comprises a gravity based angle indicator 70 that is similar to the first gravity based angle indicator, and also indicates the complement of the angle of the first longitudinal axis "B" with respect to vertical.

It should be understood that any other suitable type of angle indicating device could be used in place of the first angle measuring means 60 and the second angle measuring means 70. For instance, in an alternative embodiment device 120 of the present invention, as shown in FIG. 5, an electronic inclinometer, which is a digital type gravity based angle indicator, is shown mounted on each of the first arm member 130 and the second arm member 140, of the device 120.

Reference will now be made to FIGS. 6 through 9, which show the preferred embodiment device 20 in use.

Figure 6:
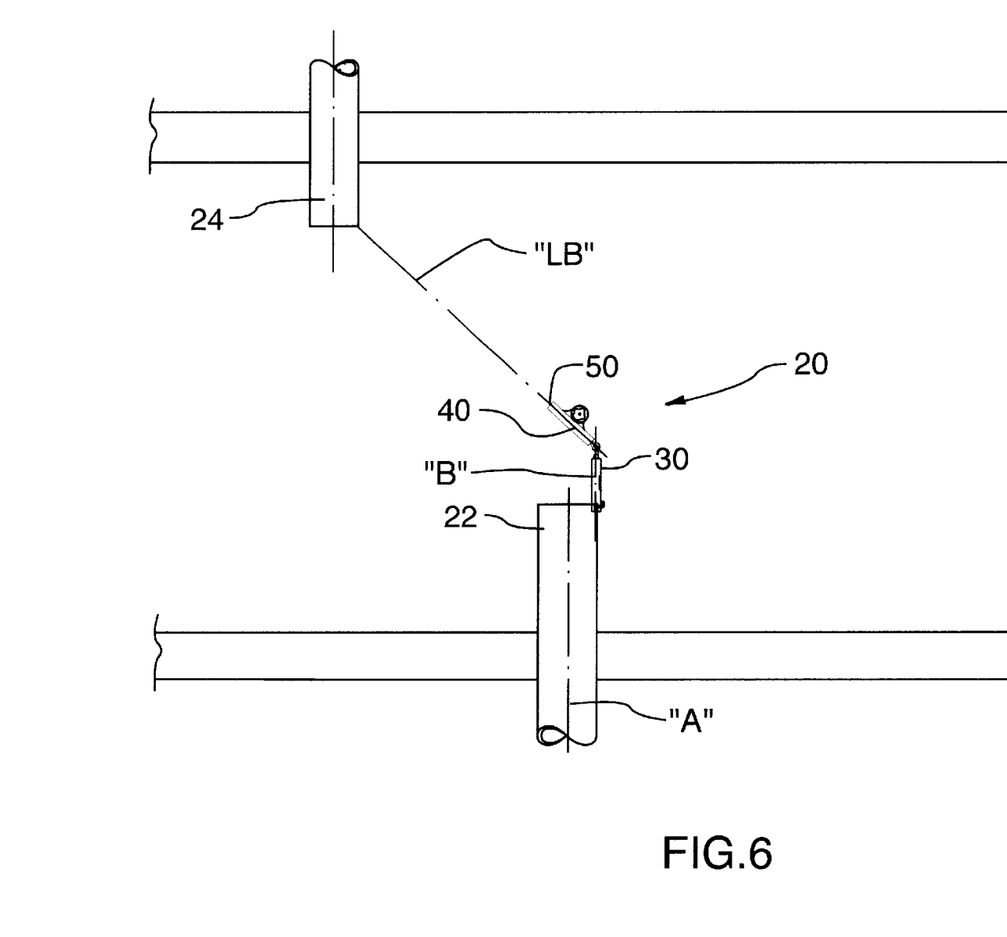
FIG. 6 is a reduced scale side elevational view of the device of FIG. 1 in use at an installation, for determining the angle of the elbow to construct to join a first pipe to a remote second pipe.

Use of the device 20 of the present invention will now be described with reference to FIG. 6. The device 20 has been secured to the end of a first pipe 22, which first pipe 22 has been received into the slot 38 of the first arm member 30 such that the first pipe 22 is securely engaged against the second object engaging surface 36b. The first pipe 22 is secured in place by the threaded fastener 82. The second arm member 40 is then pivoted about the transverse pivot axis "T" such that the laser 50 projects its laser beam "LB" to the destination, mainly the second pipe 24. The first gravity based angle indicator 60 is read, specifically the two arms that show the complementary angles, to indicate the angle that the first pipe 22 must be "bent" in order to be directed at the end of the second pipe 24.

Figure 7:
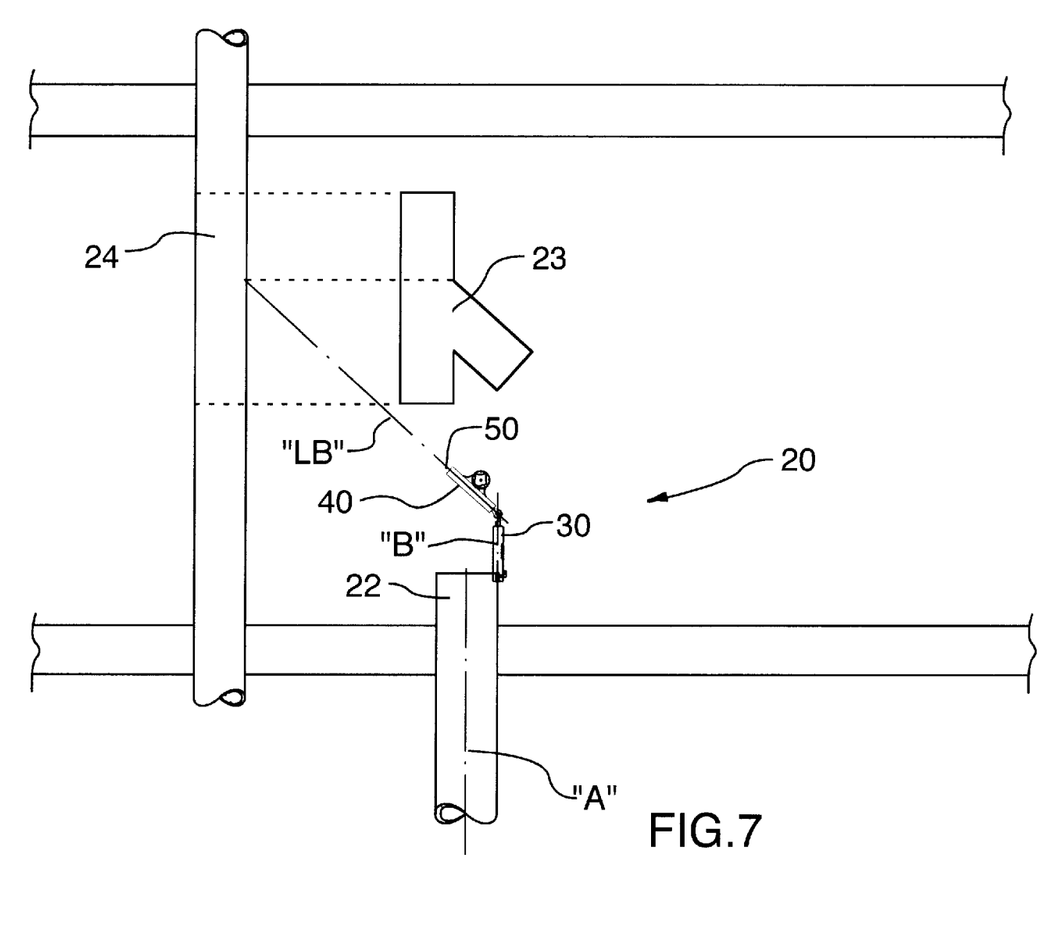
FIG. 7 is a reduced scale side elevational view of the device of FIG. 1 in use at an installation, for locating a "Y"-branch of a known angle.

Reference with now be made to FIG. 7, which shows the device 20 of the present invention secured in place on the end of the first pipe 22. A "Y"-connector 23 of a known angle, such as 30 degrees, is to be used on the second pipe. The precise location of the "Y"-connector 23 must be determined. The first arm member 30 and the second arm member 40 are set to a known angle of 30 degrees, as indicated by the complementary pointers on the first gravity based angle indicator 60 on the first arm member 30. This setting of the angle must be done with the first gravity based angle indicator 60 oriented vertically upwardly. When the device 20 is in place, the laser 50 projects its laser beam "LB" to the location on an existing pipe where "Y"-connector 23 of the same known angle of 30 degrees is to be inserted.

Figure 8:
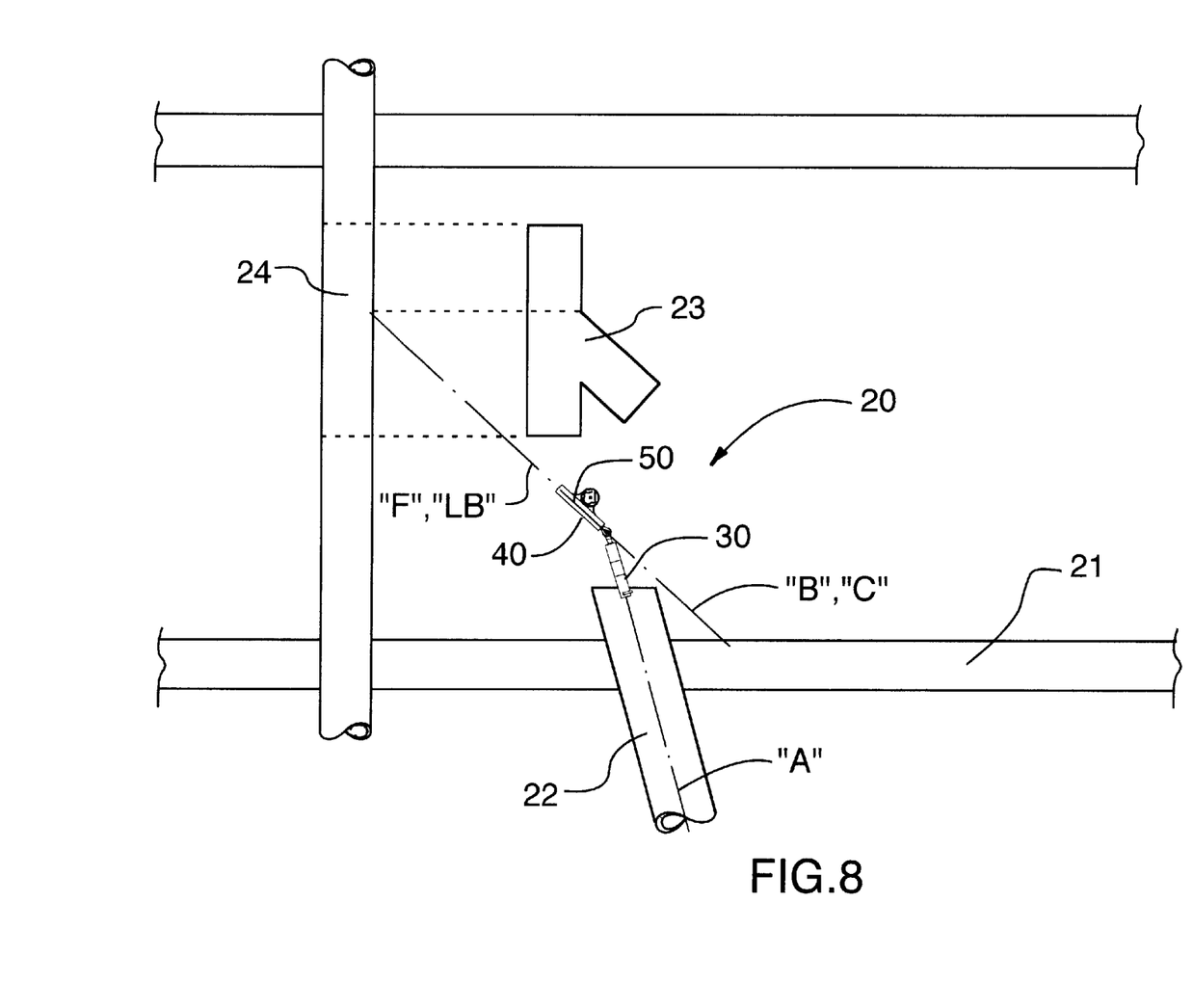
FIG. 8 is a reduced scale top plan view of the device of FIG. 1 in use at an installation for determining the angle of an elbow to be constructed and installed at a first pipe, so as to join to a "Y"-branch of a known angle of a second pipe.
Figure 9:
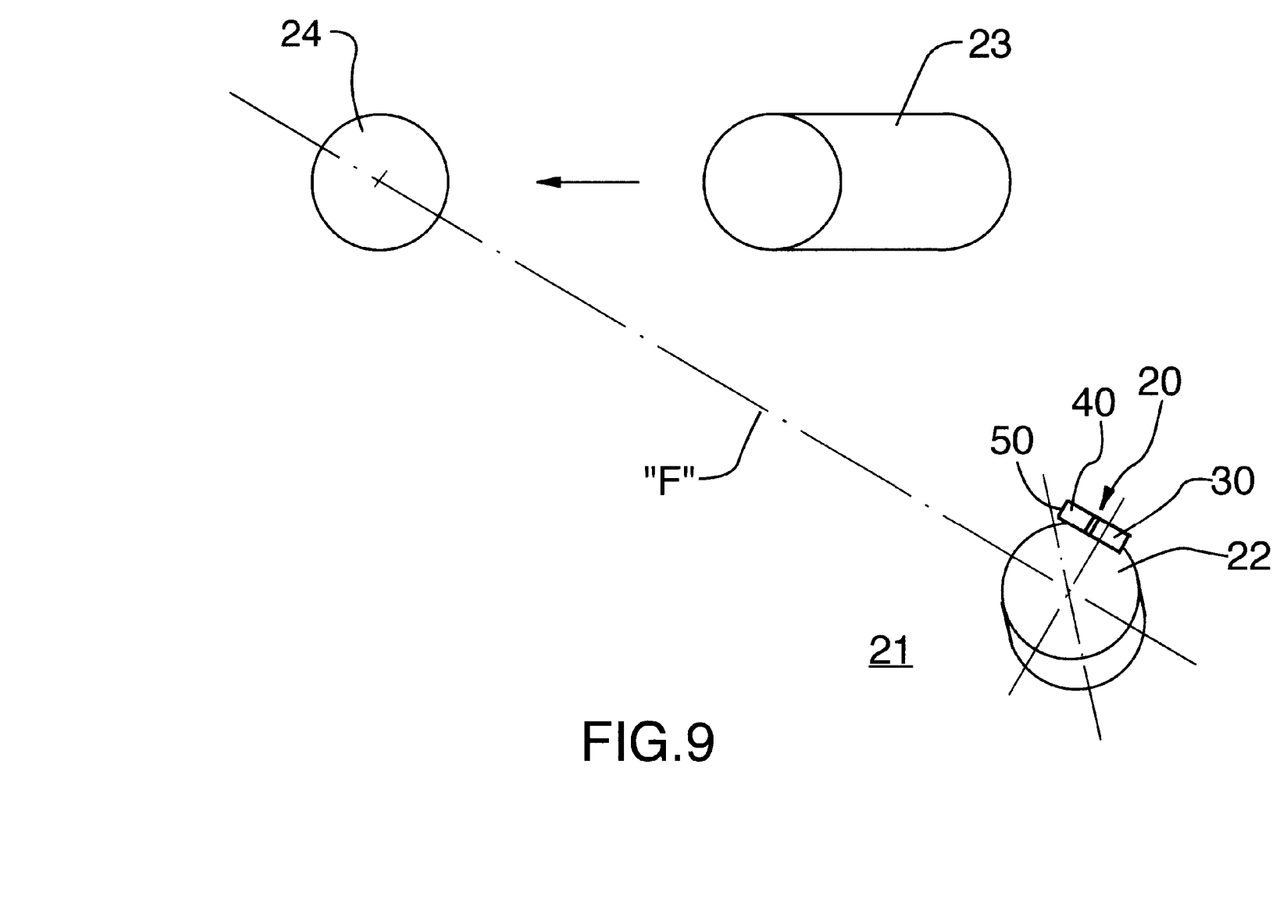
FIG. 9 is a reduced scale top view of the installation of FIG. 8.

Reference will now be made to FIGS. 8 and 9, which show the device 20 of the present invention being used to determine a compound angle. One example of this situation occurs when an existing pipe is not oriented either vertically or horizontally, but instead is oriented at a slightly skewed angle. As can be best seen in FIG. 8, the first pipe 24 projects out of the floor 21 at a slightly skewed angle, instead of at a vertical orientation. The first pipe 22 is to be connected to the second pipe 24 using a "Y"-connector 23 of a known angle at the second pipe 24, such as 30 degrees, and an additional elbow of an unknown angle at the first pipe 22. In this case, an elbow must be formed and mounted on the first pipe 22, with the outer end of the formed elbow being aligned with the end of the second pipe 24. The angle of the elbow is determined in the following manner. The device 20 is first set on a flat surface with the first object engaging surface 36a facing downwardly flat against the surface, with the longitudinal axis "B" and the longitudinal "C" are collinear and the first angle indicator 60 oriented straight upwardly. The first arm member 30 is then axially rotated with respect to the second arm member 40 such that the first object engaging surface 36a faces straight downwardly and the first angle indicator 60 is oriented straight upwardly. The device 20 is then clamped to the pipe 22 in a position that is transverse to the axis "F" extending between the first pipe 22 and the second pipe 24. The device 20 is clamped on loosely at the slot 38 by means of the threaded fastener 82, and is then tilted such that the device 20 moves pivotally at the slot 38 with respect to the first pipe 22, until the laser beam "LB" of the laser 50 points to the precise destination at the second pipe member 24. The distal arm portion 34 of the first arm member 30 is rotated axially until the first angle indicator 60 is disposed straight upwardly. While keeping the proximal arm portion 32 and the distal arm portion 34 axially fixed with respect to each other, the second arm member 40 is raised angularly with respect to the first arm member 30 until the first gravity based angle indicator 60 indicates 90 degrees, or at the second arm member 40 is oriented exactly vertically. The device 20 is then removed from the first pipe 22. The first arm member 30 is oriented exactly vertically, and the necessary angle for the elbow is indicated by prong 62 of the first gravity angle indicator 60.

As can be understood from the above description and from the accompanying drawings, the device 20 according to the present invention, permits measuring the angle of orientation with reference to a known frame of reference between a first object having a first axis and a second remote destination, which is otherwise unknown in the prior art.

Other variations of the above principles will be apparent to those who are knowledgeable in the field of the invention, and such variations are considered to be within the scope of the present invention. Further, other modifications and alterations may be used in the design and manufacture of the apparatus of the present invention without departing from the spirit and scope of the accompanying claims.

I claim:

1. A device for measuring the angle of orientation with respect to a known frame of reference between a first object having a first axis and a second remote destination, said device comprising:

a first arm member defining a first longitudinal axis and an object engaging surface substantially parallel to said first longitudinal axis for engaging a first object thereagainst;

a second arm member connected in pivotal relation to said first arm member at a primary joint for pivotal movement about a first transverse pivot axis intersecting said first longitudinal axis and defining a second longitudinal axis intersecting said first longitudinal axis and said first transverse pivot axis;

a laser mounted on said second arm member for projecting a laser beam along a laser beam axis parallel to said second longitudinal axis; and, first angle measuring means mounted on said second arm member to measure and indicate the angle of said second longitudinal axis with respect to a fixed reference frame other than said first longitudinal axis, wherein said first angle measuring means also indicates the complement of said angle of said second longitudinal axis with respect to a fixed reference frame other than said first longitudinal axis.

2. The device of claim 1, wherein said laser beam axis is collinear with said second longitudinal axis.

3. The device of claim 1, wherein said first angle measuring means comprises a gravity-based angle indicator.

4. The device of claim 3, wherein said gravity based angle indicator is viewable from two opposed directions.

5. The device of claim 3, wherein said gravity based angle indicator comprises an analog type indicator.

6. The device of claim 3, wherein said gravity based angle indicator comprises a digital type indicator.

7. The device of claim 1, further comprising a second angle measuring means mounted on first arm member to measure the angle of rotation of said first longitudinal axis with respect to a fixed reference frame other than said second longitudinal axis.

8. The device of claim 7, wherein said second angle measuring means also indicates the complement of said angle of said first longitudinal axis with respect to a fixed reference frame other than said first longitudinal axis.

9. The device of claim 8, wherein said second angle measuring means comprises a gravity-based angle indicator.

10. The device of claim 1, wherein said first arm member comprises a proximal arm portion and a distal arm portion, wherein said proximal arm portion has said second arm member connected in pivotal relation thereto, as aforesaid, and said distal arm portion is connected in pivotal relation to said proximal arm portion for pivotal movement about an arm pivot axis parallel to said first longitudinal axis.

11. The device of claim 10, wherein said arm pivot axis is collinear with said first longitudinal axis.

12. The device of claim 1, further comprising a second object engaging surface disposed on said first arm member for engaging a first object thereagainst and oriented parallel to said first longitudinal axis.

13. The device of claim 12, wherein said second object engaging surface comprises a slot disposed in said first arm member for receiving a first object therein.

14. The device of claim 13, further comprising securing means operatively mounted adjacent said slot disposed in said first arm member for securing a first object in said slot.

15. The device of claim 14, wherein said securing means comprises a threaded fastener.

16. The device of claim 1, wherein said second arm member is connected in pivotal relation to said first arm member at a primary joint, as aforesaid, in snug fitting relation so as to preclude unwanted relative angular movement between said first and second arm members.

17. The device of claim 16, wherein said first and second arm members are connected one to the other through low friction mating surfaces.

18. The device of claim 1, wherein said distal arm portion of said first arm member is connected in pivotal relation to said proximal arm portion of said first arm member, as aforesaid, in snug fitting relation so as to preclude unwanted relative angular movement between said distal arm portion and said proximal arm portion.

19. The device of claim 18, wherein said distal arm portion and said proximal arm portion each have a low friction mating surface, and said distal arm portion and said proximal arm portion are connected one to the other at said low friction mating surfaces.

* * * * *